Dec. 17, 1946.                     C. P. WEST                    2,412,931
                              SWITCHGEAR APPARATUS
                        Filed Dec. 15, 1943          3 Sheets-Sheet 1

WITNESSES:
C. J. Weller.

INVENTOR
Charles P. West.
ATTORNEY

Dec. 17, 1946.  C. P. WEST  2,412,931
SWITCHGEAR APPARATUS
Filed Dec. 15, 1943  3 Sheets-Sheet 2

WITNESSES:

INVENTOR
Charles P. West.
ATTORNEY

Dec. 17, 1946.  C. P. WEST  2,412,931
SWITCHGEAR APPARATUS
Filed Dec. 15, 1943  3 Sheets-Sheet 3

WITNESSES:

INVENTOR
Charles P. West.

ATTORNEY

Patented Dec. 17, 1946

2,412,931

UNITED STATES PATENT OFFICE 2,412,931

SWITCHGEAR APPARATUS

Charles P. West, Forest Hills, Pa., assignor to Westinghouse Electric Corporation, East Pittsburgh, Pa., a corporation of Pennsylvania Application December 15, 1943, Serial No. 514,377

10 Claims. (Cl. 200—50)

1

My invention relates, generally, to switchgear apparatus and, more particularly, to metal-enclosed switchgear of the drawout type.

It is essential that switchgear of the drawout type for use on ships, and particularly Navy vessels, be of a rugged construction to withstand the shocks encountered during battle. It is also essential that there be no danger of the removable apparatus units, such as circuit breakers, becoming displaced while being handled on a rolling or pitching vessel. Furthermore, it is desirable that the removable apparatus units be made readily available for inspection and repair.

An object of my invention, generally stated, is to provide metal-enclosed switchgear which shall be simple and efficient in operation and which may be economically manufactured and installed.

A more specific objection of my invention is to provide a simplified and improved drawout mechanism for metal-enclosed switchgear.

Another object of my invention is to provide a drawout mechanism for metal-enclosed switchgear which can withdraw a removable apparatus unit to a position well out in front of the cell structure.

A further object of my invention is to provide a drawout mechanism for metal-enclosed switchgear which has complete control of the movement of the removable apparatus unit throughout its entire range of travel.

A still further object of my invention is to provide for controlling the movement of a removable apparatus unit through a range of travel greater than the depth of the cell in which the unit is disposed.

Still another object of my invention is to provide for interlocking the drawout-mechanism and the operating mechanism for a removable circuit breaker unit.

Other objects of my invention will be explained hereinafter or will be apparent to those skilled in the art.

According to one embodiment of my invention, a circuit breaker unit is removably secured in a truck carriage which operates on an extensible track in a metal-enclosed cell. A drawout mechanism comprising a worm and gear which operates a rotatable arm is provided for driving the truck carriage into and out of the cell. The arm is in engagement with the carriage at all times and has control of the movement of the breaker throughout its entire range of travel between the operating position in the cell and a position sufficiently in front of the cell to make the breaker

2 and the interior of the cell readily accessible for inspection and maintenance.

For a fuller understanding of the nature and objects of my invention, reference may be had to the following detailed description, taken in conjunction with the accompanying drawings, in which.

Figure 1:
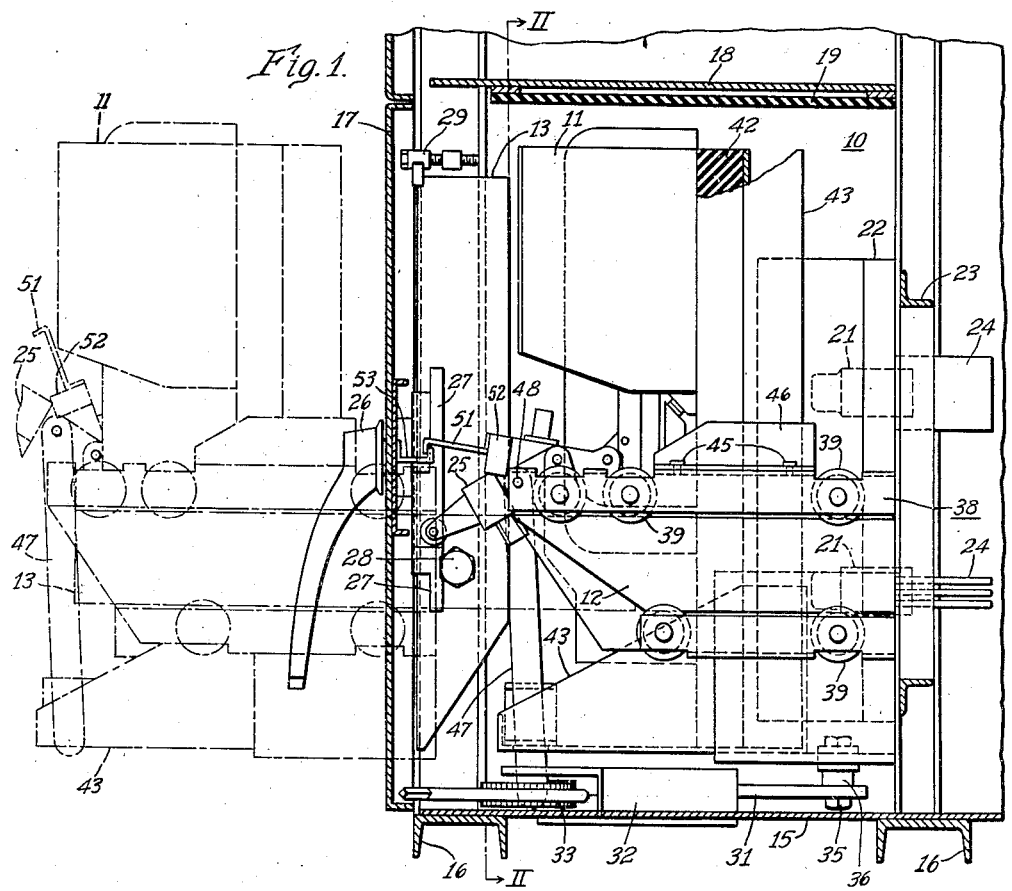
Figure 1 is a view, partially in section and partially in side elevation of a portion of a switchgear unit embodying the principal features of my invention.
Figure 2:
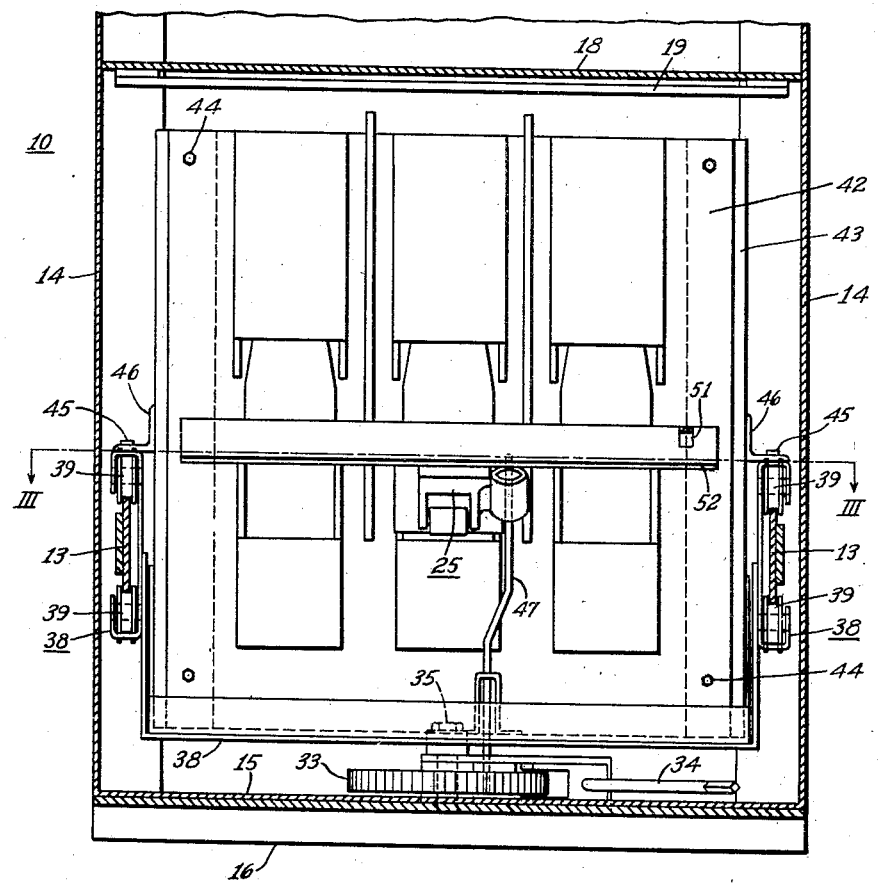
Fig. 2 is a view, partially in section and partially in front elevation of the structure shown in Fig. 1, the section being taken along line II—II of Fig. 1.

Referring to the drawings, the structure shown therein comprises a portion of a cell 10 which may be of the usual metal-enclosed type suitable for housing a removable circuit breaker unit 11 that is mounted in the cell on an extensible track having a fixed section 12 and a hinged section 13 disposed at each side of the cell 10. As shown, the cell 10 comprises side members 14, a base 15 which is mounted on channel members 16, a door 17, a partition 18 which divides the cell 10 from a similar cell disposed above the one shown, and an insulating barrier 19 disposed beneath the partition 18.

The circuit breaker 11 is of the drawout type and is provided with suitable disconnect contact members for engaging fixed contact members 21 which are mounted on a base 22 disposed at the rear of the cell 10 and supported by a framework 23. Suitable connections 24 are provided on the contact members 21 for connecting power conductors to these members.

The breaker 11 is provided with an operating mechanism 25 for operating the contact members of the circuit breaker which interrupt the power circuit in a manner well known in the art. The operating mechanism 25 may be actuated by a handle 26 which is mounted on the front of the door 17 and is provided with a shaft which extends through the door and carries a pair of spaced operating arms 27 for engaging the operating mechanism 25 when the door 17 is closed.

Figure 3:
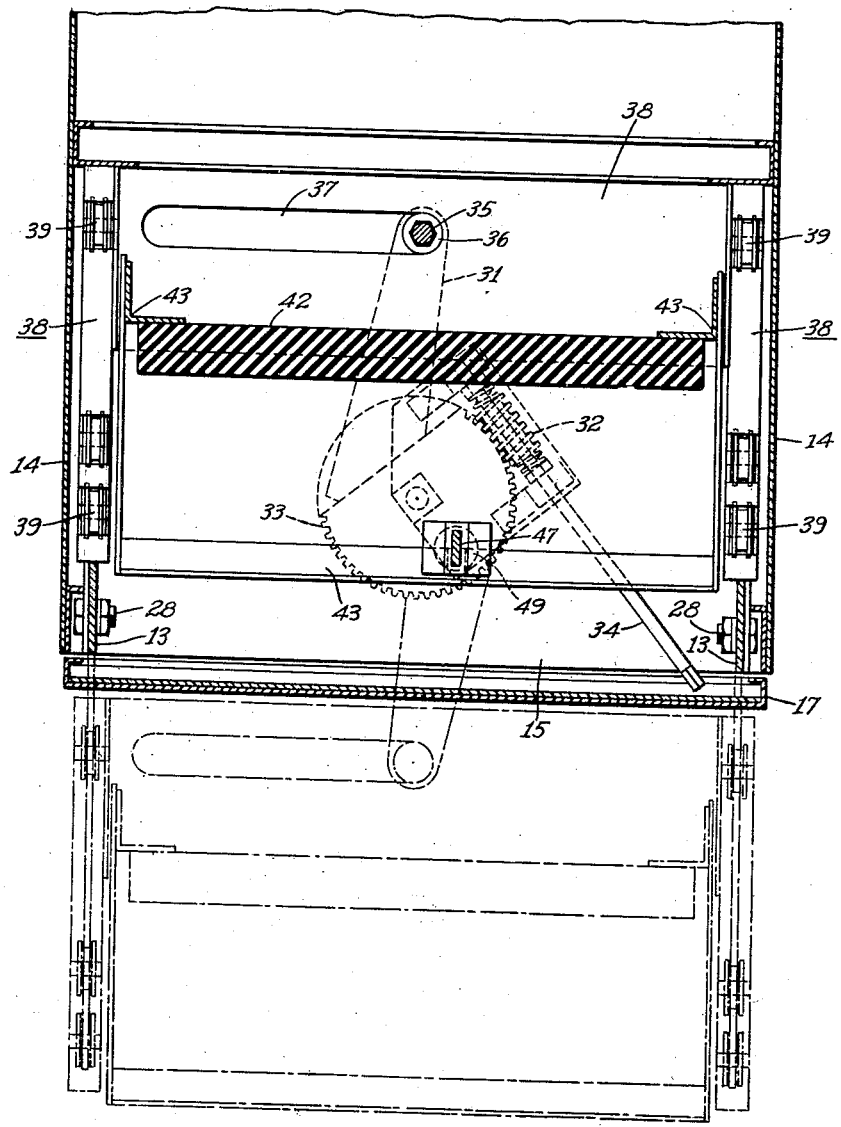
Fig. 3 is a sectional view, taken along the line III—III of Fig. 2, a portion of the apparatus being removed.
Figure 3:

As shown in Figs. 1 and 3, the extensible track members 13, which are hinged to the fixed track members 12 by bolts 28, may be lowered to a horizontal position to permit the breaker 11 to be withdrawn from the cell 10. When the breaker 11 is fully inserted into the cell, the hinged members 13 may be raised to a vertical position and secured by latch members 29, thereby retaining the breaker in the cell. The door 17 may then be closed, and the breaker operated by means of the handle 26.

In order to provide a drawout mechanism which is capable of withdrawing the breaker 11 to a position well out in front of the cell 10 and also which has complete control of the movement of the breaker unit throughout its entire range of travel, a rotatable arm 31 operated by a worm 32 and a gear 33 may be utilized to move the breaker unit into and out of the cell 10. The worm 32 may be driven by a shaft 34, thereby operating the arm 31 through an angle of approximately 180° as shown in Fig. 3.

The gear 33 is mounted on the bottom plate 15 of the cell 10, and one end of the arm 31 is secured to the gear 33. The other end of the arm 31 is provided with a bolt 35 on which is mounted a rotatable sleeve 36. The sleeve 36 is disposed in a slot 37 provided in the bottom of a truck carriage 38 in which the breaker unit 11 is mounted. The truck carriage 38 is provided with rollers 39 which engage the track members 12 and 13.

As shown, the breaker mechanism is mounted on an insulating panel 42 which is secured to a frame 43 by means of bolts 44. As shown in Fig. 1, the frame 43 is provided with horizontally extending side members which make the breaker unit stable when it is secured in the frame 43. Thus, the breaker unit may be mounted in the frame 43 prior to its insertion into the cell 10, and the frame 43 then set into position in the truck carriage 38. The frame may be secured to the truck carriage by means of screws 45 which extend through angle members 46, provided on the sides of the frame 43, into the sides of the truck carriage 38. In this manner, the breaker unit may be securely held in the truck carriage.

Since the movement of the truck carriage 38 is at all times under the control of the arm 31, the movement of the breaker unit 11 into and out of the cell 10 is controlled by the drawout mechanism throughout the entire range of travel. Therefore, it is impossible for the breaker unit to become displaced as a result of the lurching or pitching of a vessel.

Furthermore, as shown most clearly in Figs. 1 and 3, the arm 31 is of sufficient length to move the breaker unit 11 to a position well out in front of the cell 10, thereby making the breaker and cell parts completely accessible for inspection or maintenance. This feature is not obtainable with drawout mechanisms of previous types, such as long screw drives, which move the rear of the breaker unit only to the front edge of the cell and cannot control the movement through a range of travel greater than the depth of the cell, as can the device hereindescribed.

In order to prevent the primary disconnect contact members 21 from being engaged or disengaged while the contact members of the circuit breaker are closed, a mechanical interlock is provided. As shown, the interlock comprises a bar 47, one end of which is connected to the operating mechanism 25 by a pin 48. The other end of the bar 47 is disposed in an opening 49 in the gear 33 when the breaker unit 11 is fully inserted into the cell 10, and the operating mechanism 25 is in the closed position.

In this manner, the bar 47 prevents rotation of the gear 33 until the operating mechanism 25 is raised to the open position, thereby raising the bar 47 sufficiently to withdraw it from the opening in the gear 33, as indicated by the broken lines shown in Fig. 1. Therefore, it is necessary for the contact members of the circuit breaker to be opened before the breaker unit 11 can be withdrawn from the cell 10.

Likewise, the breaker unit 11 cannot be inserted into the cell to engage the disconnect contact members 21 while the operating mechanism 25 is in the closed position. If an attempt is made to insert the breaker unit into the cell with its contact members closed, the lower end of the bar 47 will strike the edge of the gear 33 prior to the engagement of the contact members 21, thereby preventing further movement of the breaker unit into the cell.

The inward movement of the breaker unit can be completed only by raising the operating mechanism 25 to the open position of the circuit breaker, thereby permitting the bar 47 to clear the gear 33. When the breaker unit is fully inserted into the cell, the operating mechanism 25 can be moved to its lowermost position to close the circuit breaker as the end of the bar 47 enters the opening 49. As explained hereinbefore, the breaker cannot be removed from the cell until the operating mechanism 25 is raised to its uppermost position, thereby lifting the bar 47 out of the opening 49.

An additional safety feature is provided which prevents the door 17 from being opened while the contact members of the circuit breaker are closed. This feature is obtained by a door interlock comprising a hook 51 which is carried by a crossbar 52 that mechanically connects the three poles of the circuit breaker unit 11. As shown in Fig. 1, the hook 51 engages a member 53 carried by the door 17 to prevent opening of the door while the contact members of the circuit breaker are closed. As indicated by the broken lines in Fig. 1, the bar 52 and the hook 51 are raised to disengage the member 53 when the contact members of the breaker are opened, thereby permitting the door 17 to be opened.

From the foregoing description, it is apparent that I have provided a switchgear structure having a drawout mechanism for a removable breaker unit which has complete control of the movement of the breaker unit throughout its entire range of travel. Furthermore, the breaker unit is mechanically driven to a position well out in front of the enclosing cell or cubicle and is retained in that position by the drawout mechanism. The breaker unit cannot be displaced by sudden or unexpected movements of the vessel or other structure in which the switchgear apparatus is mounted.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In switchgear apparatus, the combination with a cell and an apparatus unit removably disposed therein, of a track disposed in the cell, a truck carriage mounted on the track for supporting said unit, a rotatable arm having a pivotal axis for driving said carriage into and out of the cell, said arm being in engagement with said carriage throughout its entire range of travel, and means for operating said arm about its pivotal axis in a horizontal plane through an angle of substantially 180 degrees.

2. In switchgear apparatus, the combination with a cell and an apparatus unit removably disposed therein, of a track disposed in the cell, a truck carriage mounted on the track for supporting said unit, a rotatable arm having a pivotal axis for driving said carriage into and out of the cell, said arm being in engagement with said carriage throughout its entire range of travel, and worm and gear means for operating said arm about its pivotal axis through an angle of substantially 180 degrees.

3. In switchgear apparatus, the combination with a cell and an apparatus unit removably disposed therein, of a track disposed in the cell, a truck carriage mounted on the track for supporting said unit, a rotatable arm having a pivotal axis for driving said carriage into and out of the cell, said arm being in engagement with said carriage throughout its entire range of travel, and worm and gear means for operating said arm about its pivotal axis in a horizontal plane through an angle of substantially 180 degrees.

4. In switchgear apparatus, the combination with a cell and an apparatus unit removably disposed therein, of a track having an extensible portion extending outside of the cell disposed in the cell, a truck carriage mounted on the track for supporting said unit, a rotatable arm having a pivotal axis for driving said carriage into and out of the cell, said arm being in engagement with said carriage throughout its entire range of travel, and means for operating said arm about its pivotal axis through an angle of substantially 180 degrees.

5. In switchgear apparatus, the combination with a cell and an apparatus unit removably disposed therein, of a track having an extensible portion extending outside of the cell disposed in the cell, a truck carriage mounted on the track for supporting said unit, a rotatable arm having a pivotal axis for driving said carriage into and out of the cell, said arm being in engagement with said carriage throughout its entire range of travel, and means for operating said arm about its pivotal axis in a horizontal plane through an angle of substantially 180 degrees to drive the carriage onto the extended portion of the track, thereby moving said unit entirely outside of the cell.

6. In switchgear apparatus, in combination, a cell, a circuit breaker unit removably disposed in the cell, an operating mechanism for the contact members of the circuit breaker, a track disposed in the cell, a truck carriage mounted on the track for supporting said unit, a rotatable arm having a pivotal axis for driving said carriage into and out of the cell, said arm being in engagement with said carriage throughout its entire range of travel, means for operating said arm about its pivotal axis, and an interlocking bar actuated by said operating mechanism to engage said operating means to prevent outward movement of said carriage while the contact members of the circuit breaker are closed.

7. In switchgear apparatus, in combination, a cell, a circuit breaker unit removably disposed in the cell, an operating mechanism for the contact members of the circuit breaker, a track disposed in the cell, a truck carriage mounted on the track for supporting said unit, a rotatable arm having a pivotal axis for driving said carriage into and out of the cell, said arm being in engagement with said carriage throughout its entire range of travel, means for operating said arm about its pivotal axis, and an interlocking bar carried by the circuit breaker unit and actuated by said operating mechanism to block inward movement of the carriage beyond a predetermined point while the contact members of the circuit breaker are closed.

8. In switchgear apparatus, in combination, a cell, a circuit breaker unit removably disposed in the cell, an operating mechanism for the contact members of the circuit breaker, a track disposed in the cell, a truck carriage mounted on the track for supporting said unit, a rotatable arm having a pivotal axis for driving said carriage into and out of the cell, said arm being in engagement with said carriage throughout its entire range of travel, means for operating said arm about its pivotal axis and an interlocking bar carried by the circuit breaker unit and actuated by said operating mechanism to block inward movement of the carriage beyond a predetermined point and to prevent outward movement of the carriage while the contact members of the circuit breaker are closed.

9. In switchgear apparatus, in combination, a cell, a circuit breaker unit removably disposed in the cell, an operating mechanism for the contact members of the circuit breaker, a track disposed in the cell, a truck carriage mounted on the track for supporting said unit, a rotatable arm for driving said carriage into and out of the cell, said arm being in engagement with said carriage throughout its entire range of travel, worm and gear means for operating said arm, and an interlocking bar actuated by said operating mechanism to engage said gear to block inward movement of the carriage beyond a predetermined point and to prevent outward movement of the carriage while the contact members of the circuit breaker are closed.

10. In switchgear apparatus, the combination with a cell and an apparatus unit removably disposed therein, of extensible means for supporting said unit, an arm having a pivotal axis disposed within the cell for actuating said unit into and out of the cell on said extensible means through a range of travel greater than the depth of the cell, the movement of said unit being controlled by said arm throughout said range of travel, and means for operating said arm about its pivotal axis through an angle of substantially 180 degrees.

CHARLES P. WEST.